United States Patent
Fornage et al.

(10) Patent No.: US 9,444,367 B2
(45) Date of Patent: Sep. 13, 2016

(54) METHOD AND APPARATUS FOR GENERATING SINGLE-PHASE POWER FROM A THREE-PHASE RESONANT POWER CONVERTER

(75) Inventors: Martin Fornage, Petaluma, CA (US); Donald Richard Zimmanck, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 13/481,369

(22) Filed: May 25, 2012

(65) Prior Publication Data
US 2012/0300524 A1 Nov. 29, 2012

Related U.S. Application Data

(60) Provisional application No. 61/490,327, filed on May 26, 2011.

(51) Int. Cl.
*H02M 5/297* (2006.01)
*H02M 7/48* (2007.01)
(Continued)

(52) U.S. Cl.
CPC .......... *H02M 7/4807* (2013.01); *H02M 5/297* (2013.01); *H02J 3/382* (2013.01); *H02J 3/383* (2013.01); *H02M 2001/007* (2013.01); *H02M 2007/4815* (2013.01); *Y02B 70/145* (2013.01); *Y02B 70/1441* (2013.01); *Y02E 10/563* (2013.01)

(58) Field of Classification Search
CPC ........ H02J 3/382; H02J 3/383; H02M 5/297; H02M 7/4807; H02M 2001/007; H02M 2007/4815; Y02B 70/1441; Y02B 70/145; Y02E 10/563

USPC ....... 363/16, 17, 21.02, 21.03, 37, 123, 149, 363/157, 159, 161, 163–165, 2, 8–10, 363/97–98, 131–132
See application file for complete search history.

(56) References Cited

U.S. PATENT DOCUMENTS

| | | |
|---|---|---|
| 2,968,758 A | 1/1961 | Carter |
| 3,287,622 A | 11/1966 | Eckenfelder et al. |
| 4,012,682 A | 3/1977 | Carroll et al. |

(Continued)

FOREIGN PATENT DOCUMENTS

| | | |
|---|---|---|
| EP | 1033805 A2 | 9/2000 |
| EP | 1744140 A2 | 1/2007 |

(Continued)

OTHER PUBLICATIONS

Trubitsyn et al. (Trubitsyn et al., "High-Efficiency Inverter for Photovoltaic Applications", Energy Conversion Congress and Exposition (ECCE), 2010 IEEE , pp. 2803,2810, 12-16.*

(Continued)

*Primary Examiner* — Timothy J Dole
*Assistant Examiner* — Ivan Laboy Andino
(74) *Attorney, Agent, or Firm* — Moser Taboada (57) ABSTRACT

A method and apparatus for providing AC power. In one embodiment, the apparatus comprises a cycloconverter controller for determining a DC value based on a reference waveform and a three-phase cycloconverter, coupled to the cycloconverter controller, for selectively coupling, based on the DC value, an alternating current to an AC line to generate a single-phase AC output.

17 Claims, 9 Drawing Sheets

(51) Int. Cl.
*H02J 3/38* (2006.01)
*H02M 1/00* (2006.01)

(56) References Cited

U.S. PATENT DOCUMENTS

| | | | |
|---|---|---|---|
| 4,105,897 A * | 8/1978 | Stratton et al. | 307/3 |
| 4,363,243 A | 12/1982 | Poff | |
| 4,417,477 A | 11/1983 | Poff | |
| 4,459,532 A | 7/1984 | Schutten et al. | |
| 4,459,535 A | 7/1984 | Schutten et al. | |
| 4,469,999 A | 9/1984 | Swenson | |
| 4,570,214 A * | 2/1986 | Tanaka | 363/160 |
| 4,706,175 A | 11/1987 | Schutten et al. | |
| 4,706,183 A | 11/1987 | Schutten et al. | |
| 4,757,434 A * | 7/1988 | Kawabata et al. | 363/41 |
| 5,159,539 A * | 10/1992 | Koyama | 363/8 |
| 5,198,970 A * | 3/1993 | Kawabata et al. | 363/37 |
| 5,274,538 A * | 12/1993 | Sashida et al. | 363/8 |
| 5,285,365 A * | 2/1994 | Yamato et al. | 363/8 |
| 5,285,371 A * | 2/1994 | Sanada et al. | 363/71 |
| 5,652,503 A | 7/1997 | Urban et al. | |
| 5,886,893 A * | 3/1999 | Asai et al. | 363/161 |
| 6,219,268 B1 * | 4/2001 | Asai et al. | 363/161 |
| 6,320,356 B1 * | 11/2001 | Asai et al. | 322/27 |
| 6,344,988 B2 * | 2/2002 | Asai et al. | 363/149 |
| 7,050,312 B2 | 5/2006 | Tracy et al. | |
| 7,088,601 B2 | 8/2006 | Tracy et al. | |
| 7,113,405 B2 | 9/2006 | Armstrong et al. | |
| 7,372,709 B2 * | 5/2008 | Mazumder et al. | 363/16 |
| 7,405,494 B2 | 7/2008 | Tassitino, Jr. et al. | |
| 7,508,094 B2 | 3/2009 | Johnson, Jr. et al. | |
| 7,561,451 B2 | 7/2009 | Tracy et al. | |
| 7,583,109 B2 | 9/2009 | Oughton, Jr. et al. | |
| 7,684,222 B2 | 3/2010 | Paatero | |
| 7,768,800 B2 * | 8/2010 | Mazumder et al. | 363/17 |
| 7,800,924 B2 | 9/2010 | Oughton, Jr. et al. | |
| 7,948,778 B2 | 5/2011 | Pfitzer et al. | |
| 8,350,411 B2 | 1/2013 | Kimball et al. | |
| 8,466,658 B2 * | 6/2013 | Kajouke | 320/128 |
| 2005/0012487 A1 * | 1/2005 | Skeist | H02P 9/007 318/727 |
| 2007/0035265 A1 * | 2/2007 | Balog et al. | 318/439 |
| 2008/0239775 A1 | 10/2008 | Oughton et al. | |
| 2008/0265681 A1 | 10/2008 | Pfitzer et al. | |
| 2009/0323380 A1 | 12/2009 | Harrison | |
| 2010/0014322 A1 | 1/2010 | Harrison | |
| 2010/0284208 A1 * | 11/2010 | Nguyen et al. | 363/160 |
| 2010/0290174 A1 | 11/2010 | Harrison | |
| 2011/0128763 A1 * | 6/2011 | Iwata et al. | 363/98 |
| 2011/0181128 A1 * | 7/2011 | Perreault | H02M 7/797 307/151 |
| 2011/0278932 A1 | 11/2011 | Navarro et al. | |
| 2012/0038434 A1 | 2/2012 | Harrison | |
| 2012/0068541 A1 | 3/2012 | Anderson et al. | |
| 2012/0074786 A1 | 3/2012 | Johnson, Jr. et al. | |
| 2012/0086536 A1 | 4/2012 | Harrison | |
| 2012/0092913 A1 | 4/2012 | Harrison et al. | |
| 2012/0139514 A1 | 6/2012 | Paatero | |
| 2012/0153995 A1 | 6/2012 | Oughton, Jr. et al. | |
| 2012/0170341 A1 * | 7/2012 | Fornage et al. | 363/132 |
| 2012/0300524 A1 * | 11/2012 | Fornage et al. | 363/132 |

FOREIGN PATENT DOCUMENTS

| | | |
|---|---|---|
| EP | 2079140 A1 | 7/2009 |
| JP | 07007944 A2 | 1/1995 |
| JP | 2000152652 A | 5/2000 |
| JP | 2000341952 A | 12/2000 |
| JP | 2001298954 A | 10/2001 |
| WO | 0105659 A2 | 9/2001 |
| WO | 2006043837 A2 | 4/2006 |
| WO | 2008026938 A2 | 3/2008 |
| WO | 2010055282 A1 | 5/2010 |
| WO | 2011062508 A2 | 5/2011 |
| WO | 2011102910 A1 | 8/2011 |
| WO | 2012002824 A2 | 1/2012 |
| WO | 2012002825 A2 | 1/2012 |
| WO | 2012005604 A2 | 1/2012 |
| WO | 2012062375 A1 | 5/2012 |
| WO | 2012081998 A2 | 6/2012 |

OTHER PUBLICATIONS

US 6,181,581, 1/2001, Samsung Electronics Co., Ltd (withdrawn).
International Search Report and Written Opinion mailed Aug. 30, 2012 for PCT Application No. PCT/US2012/039503, 6 pgs.
Pinheiro et al., "Zero Voltage Switching Series Resonant Based Dc-Ac Converter", IEEE Canadian Conference on Electrical and Computer Engineering, vol. 2, pp. 549-552, May 24-28, 1998.
Yatsuki et al., "A Novel AC Photovoltaic Module System Based on the Impedance-Admittance Conversion Theory", IEEE 32nd Annual Power Electronics Specialists Conference, vol. 4, pp. 2191-2196, 2001.
Trubitsyn et al., "High-Efficiency Inverter for Photovoltaic Applications", Energy Conversion Congress and Exposition (ECCE), 2010 IEEE, pp. 2803-2810, Sep. 12-16, 2010.
Extended European Search Report dated Aug. 5, 2015 for European Application No. 12789203.2-1809.
Pinheiro et al., "Zero Voltage Switching Series Resonant Based DC-AC Converter", IEEE Canadian Conference on Electrical and Computer Engineering, 1998, vol. 2, pp. 549-552, May 24, 1998.

* cited by examiner

METHOD AND APPARATUS FOR GENERATING SINGLE-PHASE POWER FROM A THREE-PHASE RESONANT POWER CONVERTER

CROSS-REFERENCE TO RELATED APPLICATIONS

This application claims benefit of U.S. provisional patent application Ser. No. 61/490,327, filed May 26, 2011, which is herein incorporated in its entirety by reference.

BACKGROUND OF THE INVENTION

1. Field of the Invention

Embodiments of the present disclosure relate generally to power conversion, and, in particular, to controlling power conversion in a resonant converter.

2. Description of the Related Art

Resonant converters provide many advantages over other types of power converters. Such advantages may include low noise, low component stress, low component count, and predictable conduction-dominated losses. Resonant converters may therefore be smaller, less costly, and more efficient devices other types of converters.

Therefore, there is a need in the art for a method and apparatus for efficiently converting a DC voltage to an AC voltage utilizing a resonant converter.

SUMMARY OF THE INVENTION

Embodiments of the present invention generally relate to a method and apparatus for providing AC power. In one embodiment, the apparatus comprises a cycloconverter controller for determining a DC value based on a reference waveform and a three-phase cycloconverter, coupled to the cycloconverter controller, for selectively coupling, based on the DC value, an alternating current to an AC line to generate a single-phase AC output.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
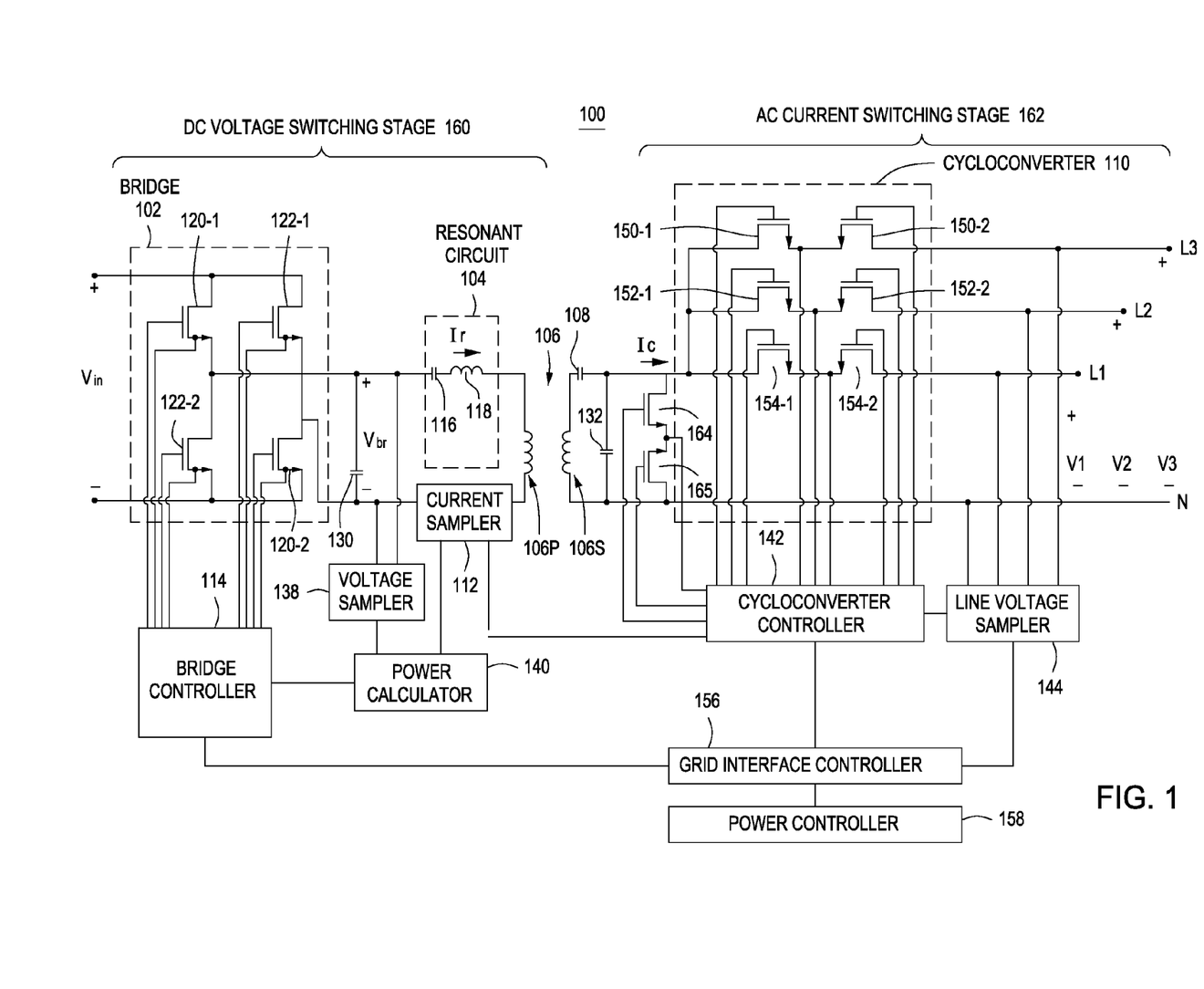
FIG. 1 is a block diagram of a resonant power converter in accordance with one or more embodiments of the present invention.

FIG. 1 is a block diagram of a resonant power converter 100 in accordance with one or more embodiments of the present invention. This diagram only portrays one variation of the myriad of possible system configurations. The present invention can function in a variety of power generation environments and systems.

The resonant converter 100 comprises a bridge 102 coupled across a parallel input capacitor 130 and a series combination of a capacitor 116, an inductor 118, a primary winding 106P of a transformer 106, and a current sampler 112. Such components form a DC voltage switching stage 160 of the resonant converter 100. In some embodiments, at least a portion of the capacitance of the parallel input capacitor 130 may be due to parasitic capacitance from switching devices within the resonant converter 100.

The bridge 102 is a full H-bridge comprising switches 120-1, 120-2, 122-1, and 122-2 (e.g., n-type metal-oxide-semiconductor field-effect transistors, or MOSFETs) arranged such that switches 120-1/120-2 and 122-1/122-2 form first and second diagonals, respectively, of the H-bridge. Gate terminals and source terminals of each of the switches 120-1, 120-2, 122-1, and 122-2 are coupled to a bridge controller 114 that operatively controls the switches. In other embodiments, the switches 120-1, 120-2, 122-1, and 122-2 may be any other type of suitable electronic switch, such as insulated gate bipolar transistors (IGBTs), bipolar junction transistors (BJTs), p-type MOSFETs, gate turnoff thyristors (GTOs), and the like.

The bridge 102 operates at a switching speed of approximately 100 kilohertz (kHz) and is able to switch, for example, from 60 to 600 volts depending upon the DC voltage source to the bridge 102; in other embodiments, the bridge 102 may operate at a different switching frequency. In some other embodiments, the bridge 102 may be a half H-bridge rather than a full H-bridge.

A first output terminal of the bridge 102 is coupled between the switches 120-1 and 122-2, and is also coupled to a first terminal of the parallel input capacitor 130 and to a first terminal of the capacitor 116. A second terminal of the capacitor 116 is coupled to a first terminal of the inductor 118, and a second terminal of the inductor 118 is coupled to a first terminal of the primary winding 106P. The capacitor 116 and the inductor 118 form a series resonant circuit 104 operating at a frequency of 100 kHz; alternatively, the resonant circuit 104 may operate at a different resonant frequency. In some alternative embodiments, the inductor 118 may represent a leakage inductance of the transformer 106 rather than being a separate discrete inductor and the resonant circuit for the converter 100 is formed between the transformer 106 and the capacitor 116, thereby reducing the overall component count of the resonant converter 100. In other alternative embodiments, other types of resonant circuits (e.g., series LC, parallel LC, series-parallel LLC, series-parallel LCC, series-parallel LLCC, and the like) may be utilized within the resonant converter 100 in addition to or in place of the resonant circuit 104.

The current sampler 112 is coupled between a second terminal of the primary winding 106P and a second output terminal of the bridge 102 that is coupled between the switches 122-1 and 120-2. Additionally, a voltage sampler 138 is coupled across the parallel input capacitor 130; both the voltage sampler 138 and the current sampler 112 are coupled to a power calculator 140, and the power calculator 140 is coupled to the bridge controller 114.

On the secondary side of the transformer 106, a first terminal of a secondary winding 106S is coupled to a first terminal of a capacitor 108. A second terminal of the capacitor 108 is coupled to a first terminal of a parallel output capacitor 132 and drain terminals of switches 164, 150-1, 152-1, and 154-1. A source terminal of the switch 164 is coupled to a source terminal of a switch 165. A second terminal of the parallel output capacitor 132 and a drain terminal of the switch 165 are coupled to a second terminal of the secondary winding 106S. The switch pair 164/165 forms a four-quadrant switch (i.e., a fully bi-directional switch). In some embodiments, the switches 164 and 165 may be n-type MOSFET switches; alternatively, the switches 164 and 165 may be any other type of suitable electronic switch, such as insulated gate bipolar transistors (IGBTs), bipolar junction transistors (BJTs), p-type MOSFETs, gate turnoff thyristors (GTOs), or the like. A three-phase cycloconverter 110 is coupled across the switch pair 164/165 and forms an AC current switching stage 162 of the resonant converter 100. By design selection of both the parallel input capacitor 130 and the parallel output capacitor 132, the resonant converter 100 can be designed to modulate over a wide range of power with a relatively small change in switching frequency of the bridge 102.

In some embodiments, the capacitor 116 may be on the order of 25 nanofarad (nF), the inductor 118 may be on the order of 100 microhenries (μH), the parallel input capacitor 130 may be on the order of 1 nF, the parallel output capacitor 132 may be on the order of 5 nF, and the transformer 106 may have a turns ratio of 1:1.5; such embodiments may have a frequency range of 150 kilohertz (kHz)-300 kHz. Generally, the series capacitance of the resonant circuit 104 may be on the order of 25 nF. For example, the capacitor 116 may be on the order of 25 nF and the capacitor 108 may be made extremely large such that it acts as a DC blocking capacitor and does not affect the resonance of the circuit. Alternatively, for a transformer turns ratio of 1:1.5, the capacitor 116 may be on the order of 50 nF and the capacitor 108 may be on the order of 22.2 nF (i.e., the capacitor 108 appears as a 50 nF capacitor in series with the capacitor 116 as a result of the transformer turns ratio).

The cycloconverter 110 comprises switches 150-1, 150-2, 152-1, 152-2, 154-1, and 154-2. In some embodiments, the switches 150-1, 150-2, 152-1, 152-2, 154-1, and 154-2 may be n-type MOSFET switches; in other embodiments, other suitable switches and/or arrangements of switches may be utilized. Drain terminals of the switches 150-1, 152-1, and 154-1 are coupled to the first terminal of the parallel output capacitor 132 and to the drain terminal of the switch 164. Source terminals of each switch pair 150-1/150-2, 152-1/152-2, and 154-1/154-2 are coupled together (i.e., the source terminals of switches 150-1/150-2 are coupled to one another, the source terminals of switches 152-1/152-2 are coupled one another, and the source terminals of switches 154-1/154-2 are coupled one another). Each switch pair 150-1/150-2, 152-1/152-2, and 154-1/154-2 forms a four-quadrant switch. Drain terminals of the switches 154-2, 152-2, and 150-2 are coupled to first, second, and third output terminals, respectively, of the resonant converter 100. At least one of the first, second, or third output terminals is coupled to an AC line. For example, the first, second, and third output terminals may be coupled to live conductor lines L1, L2, and L3, respectively, of a three-phase AC line as depicted in FIG. 1; alternatively, the first output terminal may be coupled to line L1 of a single-phase AC line while the second and third output terminals are not connected to any AC lines.

The second terminal of the parallel output capacitor 132 and the drain terminal of the switch 165 are each coupled to a neutral line N of the AC line. In some embodiments, the AC line may be a commercial power grid system. Gate and source terminals of the switches 150-1, 150-2, 152-1, 152-2, 154-1, 154-2, 164, and 165 are coupled to a cycloconverter controller 142, which is further coupled to the current sampler 112 as well as a line voltage sampler 144 and a grid interface controller 156.

The line voltage sampler 144 is coupled to the drain terminals of the switches 150-2, 152-2, and 154-2 (which are coupled to lines L3, L2, and L1, respectively, of the AC line) as well as to the second terminal of the parallel output capacitor 132 and the drain terminal of the switch 165 (which is coupled to line N of the AC line) for sampling the voltage on the AC line. The line voltage sampler 144 is also coupled to the cycloconverter controller 142 and the grid interface controller 156. The grid interface controller 156 is further coupled to the cycloconverter controller 142, the bridge controller 114, and a power controller 158.

During operation, the bridge 102 receives an input voltage Vin from a DC voltage source, such as one or more renewable energy sources (e.g., photovoltaic (PV) modules, wind farms, hydroelectric systems, or the like), batteries, or any suitable source of DC power. The bridge controller 114 alternately activates/deactivates the H-bridge diagonals (i.e., 180° out of phase) to generate a bridge output voltage Vbr that is a bipolar square wave. The frequency at which the H-bridge diagonals are switched (i.e., the switching frequency) is on the order of 100 kHz, i.e., proximate the resonant frequency of the resonant circuit 104, although in other embodiments other switching frequencies may be used. The bridge output voltage Vbr results in a substantially sinusoidal current Ir through the resonant circuit 104 (operating at a resonant frequency of 100 kHz) and the primary winding 106P, thereby inducing an alternating current in the secondary winding 106S of the transformer 106. The transformer 106 may be a step-up transformer for increasing the voltage from the primary to the secondary (for example, for a DC input generated by a PV module, the transformer 106 would generally be a step-up transformer) or, alternatively, a step-down transformer for decreasing the voltage.

As a result of the current induced in the secondary winding 106S, a substantially sinusoidal current waveform Ic at a frequency of 100 kHz flows to the switch pair 164/165 and the cycloconverter 110. The amplitude of the current waveform Ic is controlled by the switching frequency of the bridge 102 and can be increased or decreased by suitably adjusting the switching frequency of the H-bridge; i.e., the current (and power) transferred varies as the signal frequency moves away from the resonant frequency of the resonant circuit 104.

The power controller 158 determines an output power required from the resonant converter 100 and, via a single-phase reference current waveform generated by the grid interface controller 156, drives the bridge controller 114 to adjust the H-bridge switching frequency to achieve the required output power. In some embodiments where the resonant converter 100 receives input power from a PV module, the power controller 158 may determine the required resonant converter output power such that the PV module is biased at a maximum power point (MPP). In such embodiments, the power controller 158 may be coupled to the input of the bridge 102 for determining the voltage and current provided by the PV module. In other embodiments, the power controller 158 may receive commands from an external source to operate at a given power and power factor. For example, the resonant converter 100 may receive power from a PV module and the power controller 158 may receive a command (e.g., via the grid interface controller 156 or an alternative means) from a utility to run at a lower power than the MPP to help stabilize the grid.

The current sampler 112 samples the current Ir and generates values indicative of the sampled current ("current samples"), while the voltage sampler 138 samples the voltage Vbr and generates values indicative of the sampled primary side voltage ("primary voltage samples"). The current sampler 112 and the voltage sampler 138 may each perform such sampling at a rate of 50 MHz, although other sampling rates may be used. In some embodiments, the current sampler 112 and the voltage sampler 138 each comprise an analog-to-digital converter (ADC) for generating the samples in a digital format.

The current sampler 112 and the voltage sampler 138 respectively couple the current samples and the primary voltage samples to the power calculator 140. Based on these current and voltage samples, the power calculator 140 computes the generated power level and couples such computed power level to the bridge controller 114. The bridge controller 114 then compares the computed power level to the required output power level and adjusts the switching frequency to increase or decrease the generated power as needed.

The cycloconverter 110 selectively couples the received current waveform Ic to a single AC live conductor line and to the neutral line N to generate a single-phase AC output from the resonant converter 100. In some embodiments, such as the embodiment described below, the single-phase AC output is generated on lines L1/N; in other embodiments, the single-phase AC output may be generated on lines L2/N or L3/N.

The AC line at the converter output may be at a lower frequency than the operating frequency of the resonant converter 100; for example, the resonant converter 100 may be coupled to a commercial power grid operating at 60 Hz. In order to selectively couple the relatively high-frequency current Ic to the lower frequency AC line, a reference current waveform is generated and used to represent the grid voltage waveform and the required level of output power from the resonant converter. The grid interface controller 156 generates a single-phase reference current waveform based on resonant converter output power requirements it receives from the power controller 158 and the single-phase AC line voltage on line L1 as determined from line voltage samples it receives from the line voltage sampler 144. The line voltage sampler 144 samples the AC line voltage, for example at a rate of 30 kilosamples per second (kSPS), and couples one or more values indicative of the sampled line voltages ("line voltage samples") to the grid interface controller 156. In some embodiments, the line voltage sampler 144 comprises an ADC for generating the samples in a digital format. Based on the received power requirements and line voltage samples, the grid interface controller 156 generates the reference current waveform synchronous with the grid voltage waveform, and couples the reference current waveform to the cycloconverter controller 142. The reference current waveform ensures that even if the line voltage deviates within specified limits from a sinewave, the output current generated can be controlled to match the desired sinusoidal output at the grid frequency. In the event of the grid voltage and frequency deviating from required operational specifications, a supervisory system (not shown) will deactivate the resonant converter 100.

In some embodiments, i.e., for a desired power factor of 1, the reference current waveform is generated in phase with the line voltage. In other embodiments where reactive power is being produced by the resonant converter 100, e.g., for providing Volt-Ampere-Reactive (VAR) compensation, the reference current waveform is generated out of phase with the line voltage.

In order to selectively couple the current Ic to line L1, the cycloconverter controller 142 maintains each of the switches 150-1, 150-2, 152-1, and 152-2 in an open position and activates/deactivates the switches 154-1, 154-2 and the switch pair 164/165 based on the reference current waveform. Consecutive time windows, or "slices", of the reference current waveform are individually analyzed by the cycloconverter controller 142, with the width of each slice being equal to or a multiple of the period of the current Ic. Due to the relatively low line frequency of the reference current waveform with respect to the current Ic, the reference current waveform value remains relatively constant during a small enough slice. The cycloconverter controller 142 may thus determine for each slice a single "DC" value that represents the reference current waveform value during that slice. Based on whether the determined DC value is positive or negative for a particular slice (i.e., based on whether the polarity of the reference current waveform as represented by the DC value is positive or negative during the slice), the cycloconverter controller 142 operates the switches 154-1, 154-2, and 164/165 during the slice to half-wave rectify the current Ic into line L1 and steer the remaining half-period into the line N. When the DC value is positive for a slice, the cycloconverter controller 142 activates the switches 154-1/154-2 and deactivates at least one of the switches 164/165 during each positive half-cycle of the current Ic; during each negative half-cycle of the current Ic, the cycloconverter controller 142 deactivates at least one of the switches 154-1/154-2 (e.g., only the switch needed to block voltage may be deactivated) and activates the switches 164/165. Through such operation of the switches 154-1, 154-2, and 164/165, the entire positive portion of the charge is injected into line L1 and the entire negative portion of the charge is injected into neutral during the slice.

When the DC value is negative for a slice, the cycloconverter controller 142 activates the switches 154-1/154-2 and deactivates at least one of the switches 164/165 during each negative half-cycle of the current Ic; during each positive half-cycle of the current Ic, the cycloconverter controller 142 deactivates at least one of the switches 154-1/154-2 and activates the switches 164/165 during each positive half-cycle of the current Ic. Through such operation of the switches 154-1, 154-2, and 164/165, the entire negative portion of the charge is injected into line L1 and the entire positive portion of the charge is injected into neutral during the slice. The cycloconverter 110 operates independent of the bridge 102; i.e., the bridge 102 controls the amplitude of the output current generated, and the cycloconverter 110 controls the output current steered into the lines L1 and N. In some embodiments, the switches within the bridge 102, the switches 164/165, and/or the cycloconverter switches may be operated in a zero-voltage switching (ZVS) mode for further improved efficiency. In some embodiments, the resonant converter 100 may be operated in a ZVS mode for all of the resonant converter switching devices over the entire operating range.

In certain embodiments, not all of the switches 150-1, 150-2, 152-1, and 152-2 need to remain off while activating/deactivating the switches 154-1, 154-2 and the switch pair 164/165 to selectively couple the current Ic to line L1. If the amplitude of L1 is lower than the amplitude of the line voltage coupled to the associated switching pair, then one of the switches 150-1, 150-2, 152-1, and 152-2 could remain on and still block voltage during operation because the polarity of the voltage across the four-quadrant switch pair wouldn't change during operation. For example, if L1=100V, L2=50V, and L3=−150V, then switch 150-2 could remain on as switch 150-1 can block the operating voltages. Switches 152-1 and 152-2 would both need to remain off because the polarity of the voltage across the switch pair will oscillate during operation.

In one or more other embodiments, the resonant converter 100 may interleave two or more power stages and/or switch among a plurality of modes of operation. In some alternative embodiments, the resonant converter 100 may employ a burst technique where energy from the DC input is stored during a storage period of one or more line voltage cycles and subsequently coupled (i.e., "bursted") to one or more of the AC lines (i.e., L1, L2, and/or L3) during a burst period of one or more line voltage cycles. In embodiments employing such a "burst mode", the cycloconverter controller 142 deactivates all switches on the output lines and activates the switches 164/165 during the storage period to allow the left over resonant tank current a place to flow. The switches 164/165 remain activated during this entire time, which in some embodiments may be on the order of 16-160 ms depending on the bursting duty cycle. During this period, the tank energy decays and the converter 100 is left dormant until it "bursts", for example, for one 60 Hz period (16.7 ms). During the burst period, the cycloconverter controller 142 activates those switches on the output line or lines to which power is to be bursted and deactivates at least one of the switches 164/165. For example, when bursting power to line L1, the cycloconverter controller 142 activates the switches 154-1 and 154-2 during the burst period and deactivates at least one of the switches 164/165. One example of burst mode operation may be found in commonly assigned U.S. Pat. No. 7,768,155, issued Aug. 3, 2010 and entitled "Method and Apparatus for Improved Burst Mode during Power Conversion", which is herein incorporated in its entirety by reference.

In some alternative embodiments, at least one of the switches 164/165 is driven to remain inactive (i.e., open) and the cycloconverter controller 142 operates (i.e., activates/deactivates) each of the cycloconverter switches to couple three-phase AC power to the AC line (i.e., a first phase is coupled to line L1, a second phase is coupled to line L2, and a third phase is coupled to line L3). In such embodiments, the switch pair 150-1/150-2 form a first four-quadrant switch (i.e., a fully bi-directional switch), the switch pair 152-1/152-2 form a second four-quadrant switch, and the switch pair 154-1/154-2 form a third four-quadrant switch. One example of such an embodiment may be found in commonly assigned, co-pending U.S. patent application Ser. No. 13/342,368, entitled "Method and Apparatus for Resonant Power Conversion" and filed Jan. 3, 2012, which is herein incorporated by reference.

In some other alternative embodiments, at least one of the switches 164/165 as well as one or both cycloconverter switches on a particular output line are driven to remain inactive while the remaining cycloconverter switches are operated to couple generated current to a split-phase AC line. The converter 100 may be operated to switch between generating one, two, or three phases of output power. Further, the converter 100 may be operated to switch among which output lines one or two phases of output power are generated on. In those embodiments where a three-phase or split-phase output current is generated, the reference current waveform is a three-phase or a split-phase AC waveform, respectively.

Figure 2:
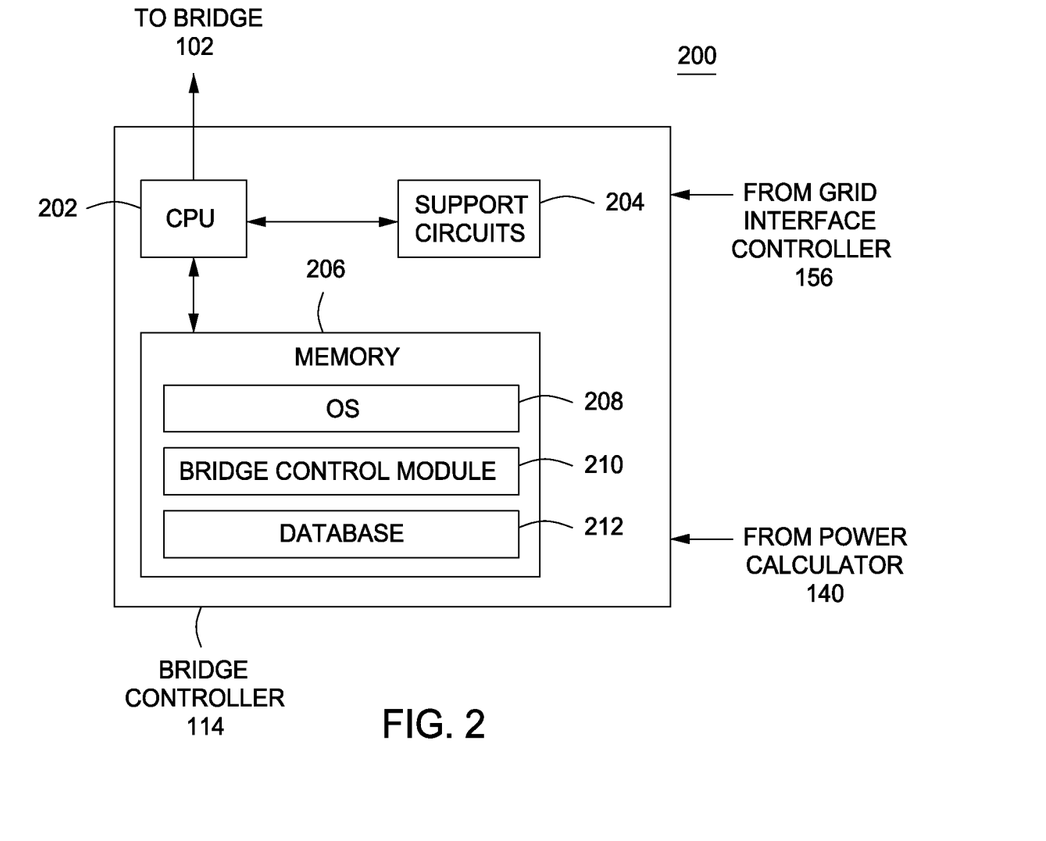
FIG. 2 is a block diagram of a bridge controller in accordance with one or more embodiments of the present invention.

FIG. 2 is a block diagram of a bridge controller 114 in accordance with one or more embodiments of the present invention. The bridge controller 114 comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The bridge controller 114 may be implemented using a general purpose computer that, when executing particular software, becomes a specific purpose computer for performing various embodiments of the present invention.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the bridge controller 114 that can be supported by the CPU capabilities. In some embodiments, the OS 208 may be one of a number of commercially available operating systems such as, but not limited to, LINUX, Real-Time Operating System (RTOS), and the like.

The memory 206 may store various forms of application software, such as a bridge control module 210 for controlling operation of the bridge 102 and performing functions related to the present invention. For example, the bridge controller 114 executes the bridge control module 210 to use the required converter output power (e.g., as determined from the reference current waveform) and the calculated bridge output power from the power calculator 140 to adjust the bridge switching frequency above or below a nominal 100 kHz frequency. For embodiments where a PV module is coupled at the input of the resonant converter 100, changing the switching frequency of the bridge 102 alters the load impedance as seen by the PV module to achieve MPP. Further detail on the functionality provided by the bridge controller 114 is described below with respect to FIG. 6.

The memory 206 may additionally store a database 212 for storing data related to the operation of the resonant converter 100 and/or the present invention.

In other embodiments, the CPU 202 may be a microcontroller comprising internal memory for storing controller firmware that, when executed, provides the controller functionality described below with respect to FIG. 6.

Figure 3:
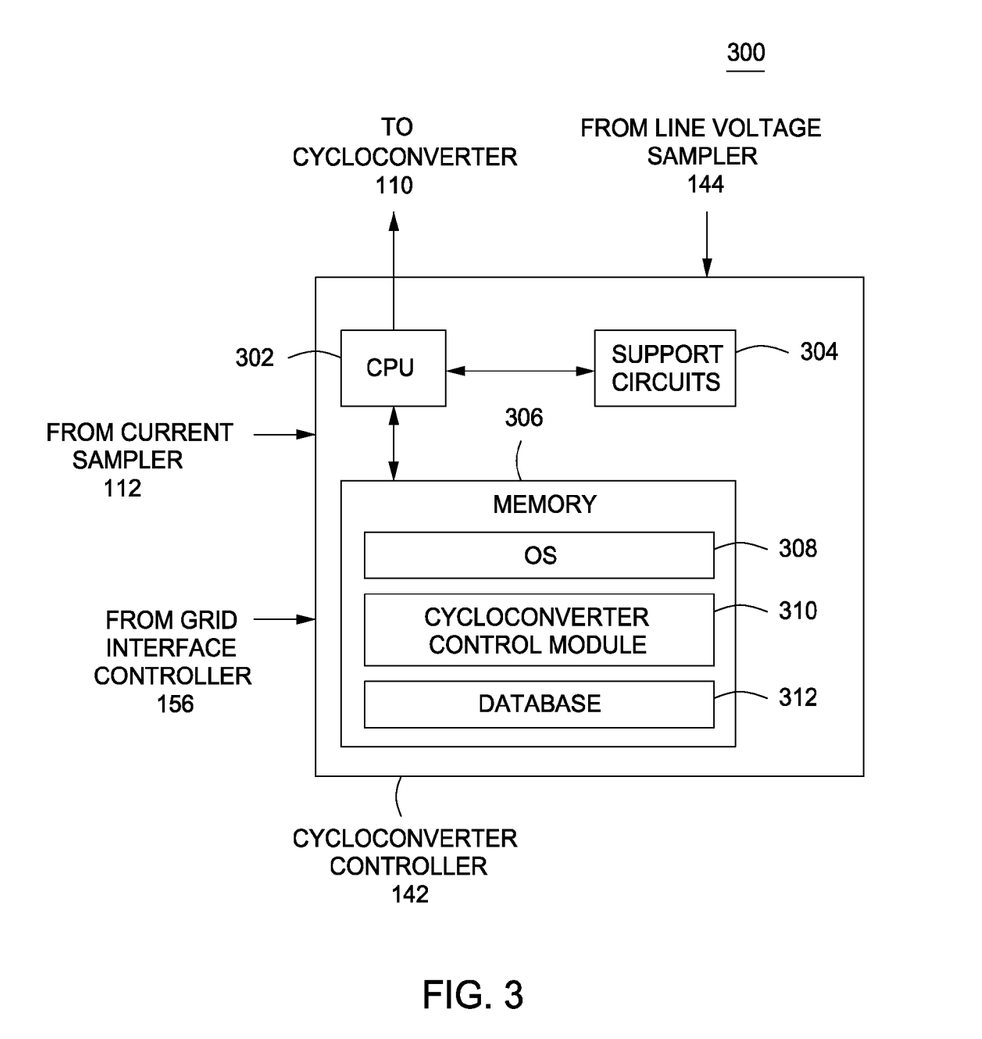
FIG. 3 is a block diagram of a cycloconverter controller in accordance with one or more embodiments of the present invention.

FIG. 3 is a block diagram of a cycloconverter controller 142 in accordance with one or more embodiments of the present invention. The cycloconverter controller 142 comprises support circuits 304 and a memory 306, each coupled to a central processing unit (CPU) 302. The CPU 302 may comprise one or more conventionally available microprocessors or microcontrollers; alternatively, the CPU 302 may include one or more application specific integrated circuits (ASICs). The support circuits 304 are well known circuits used to promote functionality of the CPU 302. Such circuits include, but are not limited to, a cache, power supplies, clock circuits, buses, input/output (I/O) circuits, and the like. The cycloconverter controller 142 may be implemented using a general purpose computer that, when executing particular software, becomes a specific purpose computer for performing various embodiments of the present invention.

The memory 306 may comprise random access memory, read only memory, removable disk memory, flash memory, and various combinations of these types of memory. The memory 306 is sometimes referred to as main memory and may, in part, be used as cache memory or buffer memory. The memory 306 generally stores the operating system (OS) 308, if necessary, of the cycloconverter controller 142 that can be supported by the CPU capabilities. In some embodiments, the OS 308 may be one of a number of commercially available operating systems such as, but not limited to, LINUX, Real-Time Operating System (RTOS), and the like.

The memory 306 may store various forms of application software, such as a cycloconverter control module 310 for controlling operation of the cycloconverter 110 and performing functions related to the present invention. For example, the cycloconverter control module 310 monitors the high frequency current Ic, determines the slices for the reference current waveform and the DC value representing the reference current waveform during each slice, determines the polarity of the reference current waveform during each slice, generates the control signals to drive the cycloconverter switches as well as the switches 164/165, and performs similar functions related to the present invention. In some embodiments, the cycloconverter control module 310 may compute one or more slice widths based on one or more stored algorithms. Further detail on the functionality provided by the cycloconverter control module 310 is described below with respect to FIG. 7.

The memory 306 may additionally store a database 312 for storing data related to the operation of the cycloconverter 110 and/or the present invention, such as one or more predetermined slice widths, one or more algorithms for determining slice widths, or the like.

In other embodiments, the CPU 302 may be a microcontroller comprising internal memory for storing controller firmware that, when executed, provides the controller functionality described below with respect to FIG. 7.

In some embodiments, the bridge controller 114 and the cycloconverter controller 142 may be a single controller controlled by the same CPU; i.e., a single controller may execute both the bridge control module 210 and the cycloconverter control module 310.

Figure 4:
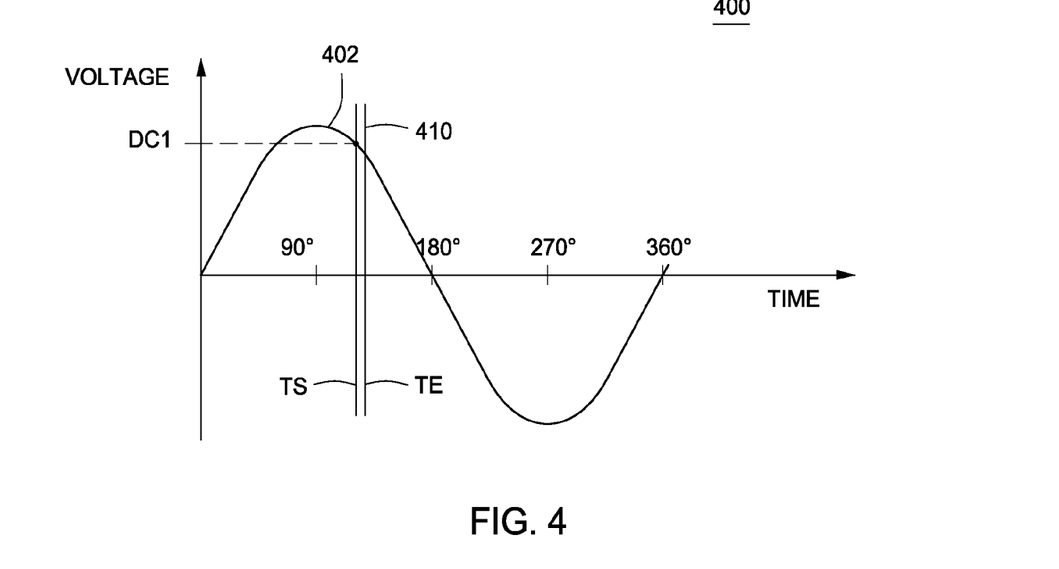
FIG. 4 is a graph depicting a slice of a three-phase reference current waveform in accordance with one or more embodiments of the present invention.

FIG. 4 is a graph 400 depicting a slice 410 of a single-phase reference current waveform 402 in accordance with one or more embodiments of the present invention. The reference current waveform 402 indicates a desired current to be injected into an AC line at the resonant converter output (e.g., AC line L1), and has the same frequency as the line voltage on that AC line (e.g., 60 Hz). The reference current waveform 402 may be in phase or out of phase with the AC line voltage depending on the desired power factor. In some embodiments, the reference current waveform 402 is a reference for a desired current to be coupled to a commercial power grid.

A time window across the reference current waveform 402 is shown as the slice 410. The slice 410 starts at a start time TS and ends at an end time TE. In some embodiments, the width of the slice 410 (i.e., the time from TS to TE) may be approximately three-orders of magnitude smaller than the period of the reference current waveform 402. For example, for a commercial power grid coupled to the resonant converter 100 and operating at a frequency of 60 Hz, the slice 410 may have a width (i.e., duration) on the order of 10 microseconds. In other embodiments, the width of the slice 410 may be greater or less than 10 microseconds. Generally, the width of each slice is equal to or a multiple of the period of the Ic current waveform.

At the time TS, the reference current waveform 402 has a value of DC1. The value DC1 may be used as a DC current value to represent the value of the reference current waveform 402 during the entire slice 410 (i.e., from time TS to time TE). Based on whether DC1 is positive or negative, the cycloconverter controller 142 operates the cycloconverter switches during the slice 410 (i.e., from the time TS to the time TE) to selectively couple the current waveform Ic to lines L1 and N, as described in detail below with respect to FIG. 5.

Figure 5:
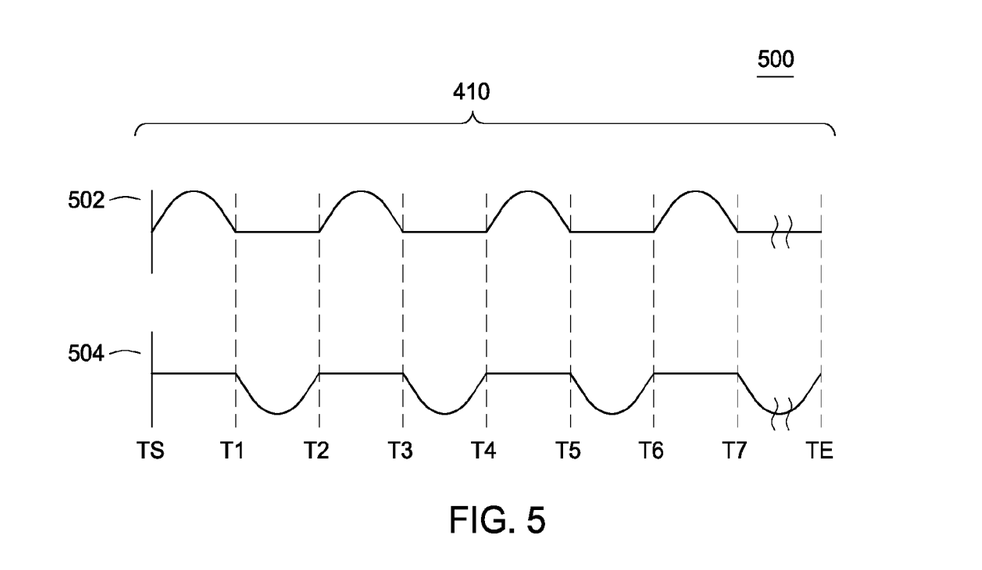
FIG. 5 is a set of graphs depicting current generated on each line of a three-phase AC line during a slice in accordance with one or more embodiments of the present invention.

FIG. 5 is a set of graphs 500 depicting current selectively coupled into AC lines L1 and N during the slice 410 in accordance with one or more embodiments of the present invention. As previously described, the cycloconverter controller 142 operates the cycloconverter 110 during each slice of the reference current waveform to selectively couple, or steer, the current Ic into the AC lines L1 and N based on the polarity of the DC value for the slice (i.e., the polarity of the reference current waveform during the slice as represented by the corresponding DC value). Accordingly, the cycloconverter controller 142 does not require information pertaining to the actual values of current to be steered into each line.

The graphs 500 comprise a first graph 502 depicting current steered from Ic into line L1 during the slice 410 and a second graph 504 depicting current steered from Ic into line N during the slice 410. In accordance with the positive polarity of the DC current value DC1 for the slice 410, the cycloconverter 110 selectively couples the entire positive portion of the charge during the slice 410 to line L1 and the entire negative portion of the charge during the slice 410 to line N.

During those time periods within the slice 410 that correspond to the positive half-cycles of the current waveform Ic, for example times TS-T1, T2-T3, and T4-T5 as depicted in FIG. 5, the cycloconverter controller 142 activates the switch pair 154-1/154-2 and deactivates at least one of the switches 164/165 to couple the positive half-cycles of the current Ic to line L1. Thus, 100% of the positive portion of the current Ic from time TS to time T7 is steered into line L1 as dictated by the positive polarity of the DC current value DC1 for the slice 410.

During those time periods within the slice 410 that correspond to the negative half-cycles of the current waveform Ic, for example times T1-T2, T3-T4, and T5-T6 as depicted in FIG. 5, the cycloconverter controller 142 deactivates at least one of the switches in the switch pair 154-1/154-2 and activates the switches 164/165 to couple the negative half-cycles of the current Ic to line N. Thus, 100% of the negative portion of the current Ic from time TS to time T6 is steered into line L1 as dictated by the positive polarity of the DC current value DC1 for the slice 410.

From time T6 to the end of the slice at time TE, one or more additional cycles of the current waveform Ic may be selectively coupled to the lines L1 and N in the same manner as occurred during the time period TS-T6. As such, for each cycle of Ic during the slice 410, the positive portion of the current Ic is steered into line L1 and the negative portion of the current Ic is steered into line N. In some alternative embodiments, the width of the slice 410 is equal to the period of the current waveform Ic, e.g., 10 microseconds, and a single cycle of the current waveform Ic is transferred to the lines L1 and N during the slice 410.

By selectively coupling the current Ic to the lines L1 and N as described above, the switch pair 154-1/154-2 and the switches 164/165 have zero-voltage switching (ZVS) and zero-current switching (ZCS) transitions. Such transition switching results in minimal cycloconverter switching losses during the DC to AC power conversion.

Figure 6:
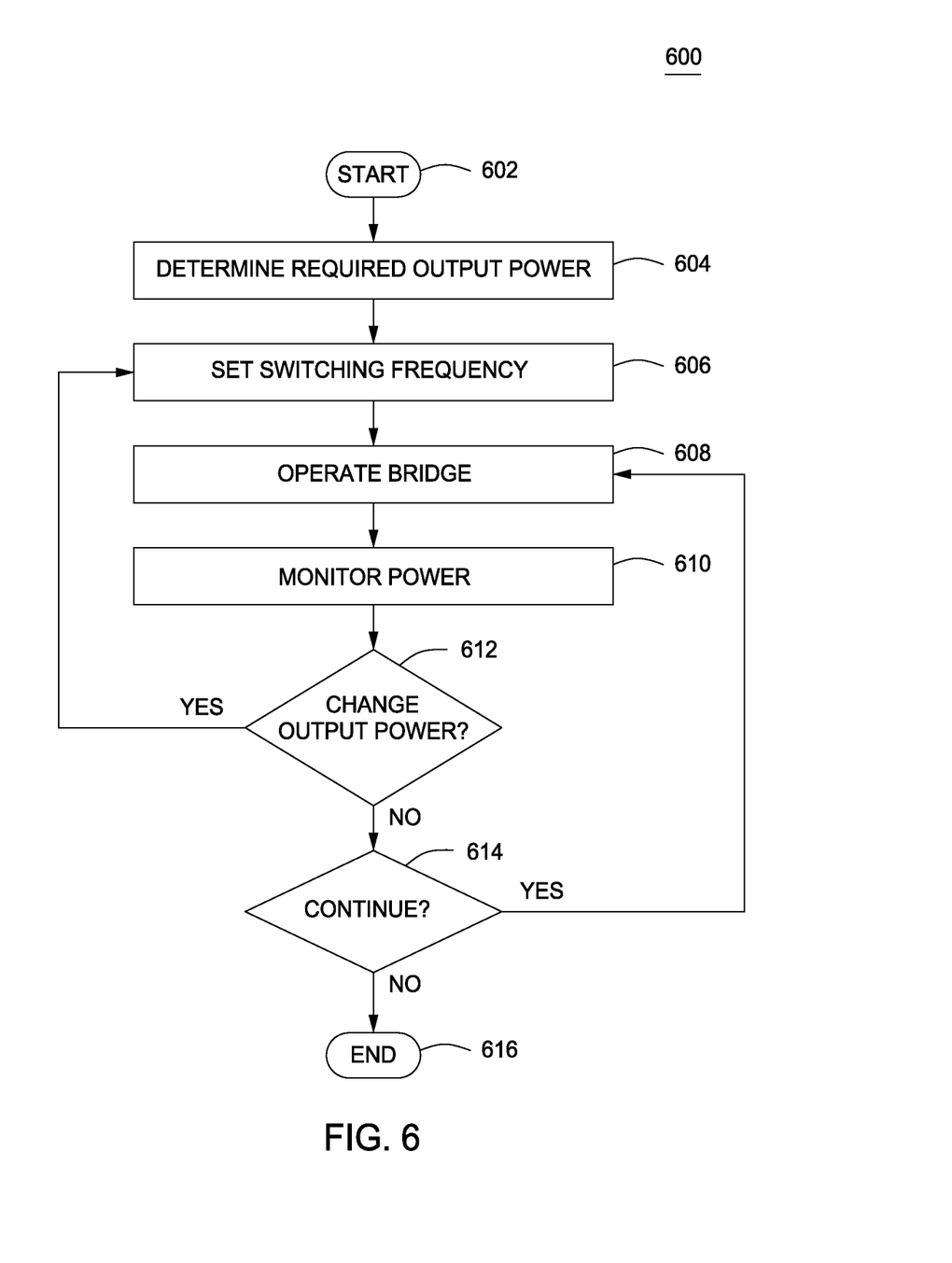
FIG. 6 is a flow diagram of a method for modulating output power from a resonant power converter in accordance with one or more embodiments of the present invention.

FIG. 6 is a flow diagram of a method 600 for modulating output power from a resonant power converter in accordance with one or more embodiments of the present invention. The method 600 is an implementation of the bridge controller 114.

In some embodiments, such as the embodiment described below, the resonant converter (e.g., the resonant converter 100) is coupled to a photovoltaic (PV) module for receiving a DC input voltage. In other embodiments, the resonant converter may additionally or alternatively receive a DC input voltage from one or more other sources.

The resonant converter utilizes a full-bridge within a DC-DC voltage switching stage at the input of the converter (e.g., the bridge 102) to generate a square wave from the DC input voltage. The resonant converter then converts the square wave to an AC output voltage. In one or more alternative embodiments, the resonant converter may utilize a half-bridge rather than a full-bridge at the input of the converter for generating the square wave.

The method 600 begins at step 602 and proceeds to step 604. At step 604, a required output power from the resonant converter is determined. The required output power may be determined such that the PV module is biased at a maximum power point (MPP). Alternatively, the required output power may be determined such that the PV module does not operate at the MPP; for example, the resonant converter may be run at a lower power than the MPP to help stabilize a commercial grid coupled to the converter. In some embodiments, a power controller, such as the power controller 158, may determine the appropriate resonant converter output power. In other embodiments, the power controller may receive commands from an external source (e.g., via a grid coupled to the converter or an alternative means) to operate at a given power and power factor.

At step 606, a switching frequency of the bridge is determined that will result in the required output power; i.e., the frequency is determined to produce the proper load impedance to the PV module to obtain maximum power from the PV module at current operating conditions. A bridge controller (such as the bridge controller 114) may determine the switching frequency based on the converter output power requirements and operate the bridge in accordance with the determined switching frequency. In such embodiments, converter output power requirements may be provided to the bridge controller via a reference current waveform that indicates a desired current to be generated by the resonant converter (e.g., the reference current waveform 402). In some embodiments, the resonant frequency of the converter may be 100 kilohertz (kHz) and the determined switching frequency may be on the order of 100 kilohertz (kHz).

The method 600 proceeds to step 608 where the bridge is operated at the determined switching frequency. At step 610, output power from the bridge is monitored. For example, a current sampler (e.g., the current sampler 112) and a voltage sampler (e.g., the voltage sampler 138) may obtain current and voltage samples, respectively, of the current and voltage levels generated by the bridge. Such current and voltages samples are then utilized to compute the power from the bridge.

At step 612, a decision is made whether the power from the bridge should be modified (increased or decreased) in order to meet the converter output power requirement for MPP operation. In some embodiments, the bridge controller may receive the computed bridge power and make such a decision. If, at step 612, it is decided that the power from the bridge must be adjusted, the method 600 returns to step 606 where a new switching frequency is determined based on whether the bridge power must be increased or decreased. Such a feedback loop is performed to continuously optimize the output power of the DC-DC switching stage of the resonant converter. If, at step 612, it is decided that the bridge power does not require any modification, the method 600 proceeds to step 614.

At step 614, a decision is made whether to continue operating the resonant converter. If, at step 614, it is decided to continue operation, the method 600 returns to step 608. If, at step 614, it is decided that operation will not continue, the method 600 proceeds to step 616 where it ends.

Figure 7:
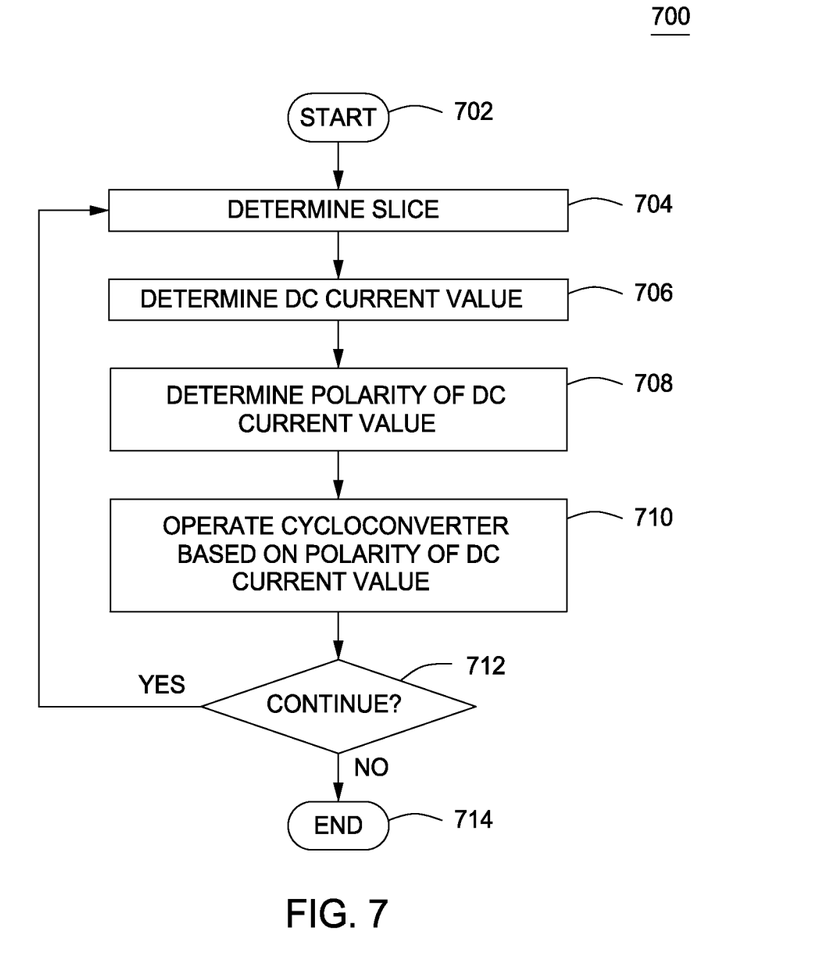
FIG. 7 is a flow diagram of a method of operation of an AC current switching stage in a resonant converter in accordance with one or more embodiments of the present invention.

FIG. 7 is a flow diagram of a method 700 for operating an AC current switching stage in a resonant converter in accordance with one or more embodiments of the present invention. In some embodiments, the method 700 is an implementation of the cycloconverter controller 142. The AC current switching stage comprises a three-phase cycloconverter having three four-quadrant switches and is part of a resonant converter that is capable of converting a DC input to a three-phase AC output (e.g., the AC current switching stage 162 and cycloconverter 110 depicted in FIG. 1). In some embodiments, such as the embodiment described below, at least one of the cycloconverter switches on each of two AC output lines remain inactive (i.e., open) during the operation of the resonant converter in order to convert the DC input to a single-phase AC output on a third AC output line. For example, the cycloconverter switches on each of AC lines L2 and L3 may be operated to remain inactive while a single-phase AC current is coupled to AC lines L1 and N. In other embodiments, the AC current switching stage may operate to generate two or three phases of output power, and/or to burst power to one, two, or three AC phases as described above.

The method 700 starts at step 702 and proceeds to step 704. At step 704, a slice—i.e., a particular time window—of a single-phase reference current waveform is determined. The reference current waveform is a single-phase AC waveform that indicates a desired current to be coupled to an AC line at the output of the resonant converter, such as a commercial AC power grid operating at 60 Hz. The reference current waveform is generated based on converter output power requirements and is synchronous with a line voltage waveform on the AC line. In those embodiments where a power factor of 1 is desired, the reference current waveform is generated in phase with the line voltage waveform. In other embodiments where reactive power is being produced by the resonant converter, e.g., for providing VAR compensation, the reference current waveform is generated out of phase with the line voltage waveform based on the desired power factor. In some embodiments, the reference current waveform may be generated by a grid interface controller, such as grid interface controller 156, as described above.

As previously described, the slice of the reference current waveform is a time window across the reference current waveform, where the width of the slice is equal to or a multiple of the period of a substantially sinusoidal current Ic generated at the input to the cycloconverter. Each slice of the reference current waveform may have a fixed width, for example on the order of 10 microseconds when the AC line (and hence the reference current waveform) is at 60 Hz, or the width may be variable from slice to slice (e.g., variation may be determined by the position in the phase). At step 706, a DC current value is determined to represent the current level of the reference current waveform within the slice. The AC line frequency, and hence the reference current waveform, has a relatively low frequency as compared to the cycloconverter input current Ic; for example, the cycloconverter may be coupled to an AC power grid operating at 60 Hz and the current Ic may be on the order of 100 kHz. As a result, the reference current waveform value remains relatively constant during a small enough slice. A single DC value may thus be used represent the value of the reference current waveform during a particular slice. In some embodiments, the value of the reference current waveform at the beginning of the slice is determined and utilized as the DC current value for the slice.

The method 700 proceeds to step 708, where the polarity of the DC current value is determined. At step 710, the cycloconverter is operated to selectively couple the current Ic to the AC conductor line, e.g., L1, and the neutral line N based on the polarity of the DC current value (i.e., the polarity of the reference current waveform during the slice as represented by the DC current value). When the DC current value is positive, the cycloconverter couples the positive half-cycle of the high-frequency input current Ic to the line L1 and the negative half-cycle of the high-frequency input current to the line N. When the DC current value is negative, the cycloconverter couples the negative half-cycle of the high-frequency input current Ic to the line L1 and the positive half-cycle of the high-frequency input current Ic to the line N.

The method 700 proceeds from step 710 to step 712. At step 712, a decision is made whether or not to continue operating the resonant converter. If a decision is made to continue, the method 700 returns to step 704 to determine the next slice; alternatively, if a decision is made to not continue, the method 700 proceeds to step 714 where it ends.

Figure 8:
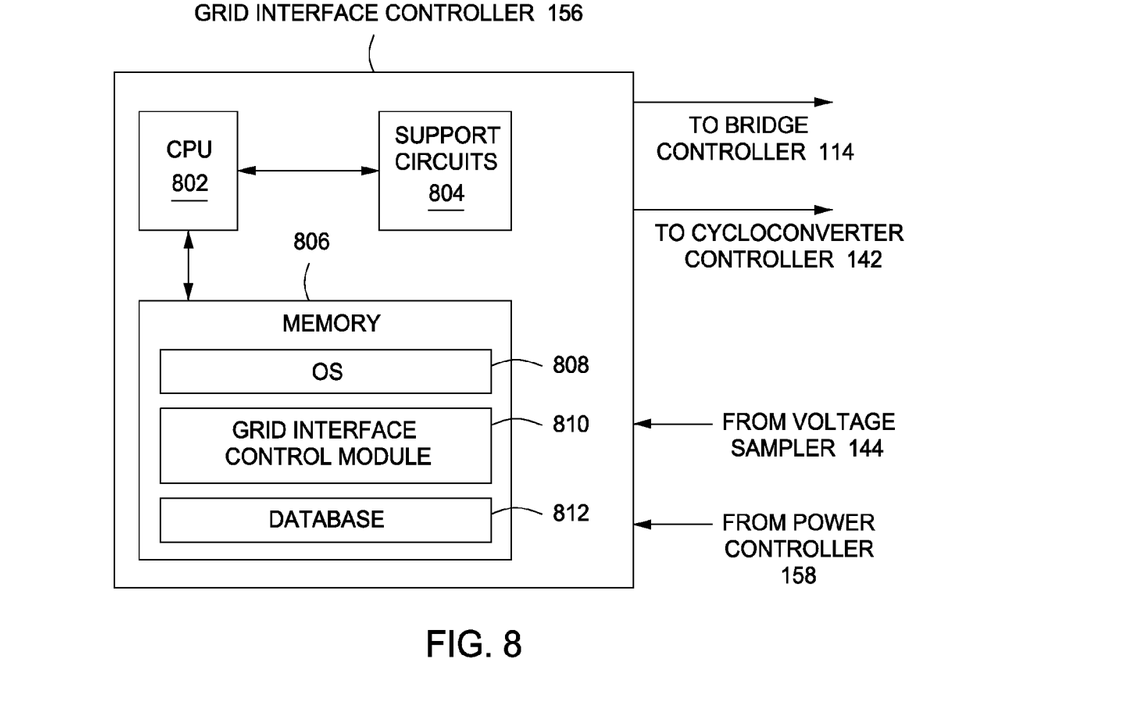
FIG. 8 is a block diagram of a grid interface controller in accordance with one or more embodiments of the present invention.

FIG. 8 is a block diagram of a grid interface controller 156 in accordance with one or more embodiments of the present invention. The grid interface controller 156 comprises support circuits 804 and a memory 806, each coupled to a central processing unit (CPU) 802. The CPU 802 may comprise one or more conventionally available microprocessors or microcontrollers; alternatively, the CPU 802 may include one or more application specific integrated circuits (ASICs). The support circuits 804 are well known circuits used to promote functionality of the CPU 802. Such circuits include, but are not limited to, a cache, power supplies, clock circuits, buses, input/output (I/O) circuits, and the like. The grid interface controller 156 may be implemented using a general purpose computer that, when executing particular software, becomes a specific purpose computer for performing various embodiments of the present invention.

The memory 806 may comprise random access memory, read only memory, removable disk memory, flash memory, and various combinations of these types of memory. The memory 806 is sometimes referred to as main memory and may, in part, be used as cache memory or buffer memory. The memory 806 generally stores the operating system (OS) 808, if necessary, of grid interface controller 156 that can be supported by the CPU capabilities. In some embodiments, the OS 808 may be one of a number of commercially available operating systems such as, but not limited to, LINUX, Real-Time Operating System (RTOS), and the like.

The memory 806 may store various forms of application software, such as a grid interface control module 810 for performing functions related to the present invention. For example, the grid interface control module 810 may generate the reference current waveform, synchronize the reference current waveform with an AC line voltage (for example, via a phase-locked loop), and the like.

The memory 806 may additionally store a database 812 for storing data related to the operation of the resonant converter 100 and/or the present invention, such as required output power levels, or the like.

In other embodiments, the CPU 802 may be a microcontroller comprising internal memory for storing controller firmware that, when executed, provides the grid interface controller functionality.

In some embodiments, two or more of the bridge controller 114, the cycloconverter controller 142, and the grid interface controller 156 may be a single controller controlled by the same CPU; i.e., a single controller may execute two or more of the bridge control module 210, the cycloconverter control module 310, or the grid interface control module 810.

Figure 9:
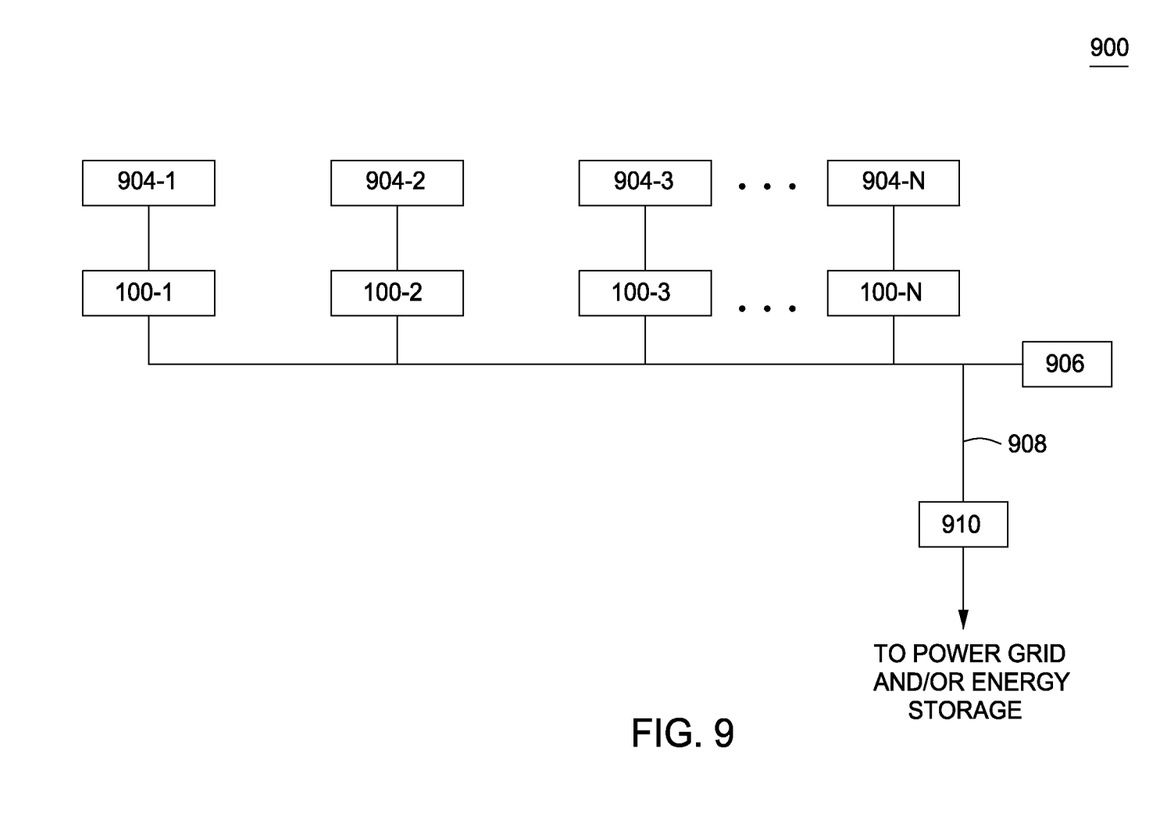
FIG. 9 is a block diagram of a system for power conversion using one or more embodiments of the present invention.

FIG. 9 is a block diagram of a system 900 for power conversion using one or more embodiments of the present invention. This diagram only portrays one variation of the myriad of possible system configurations and devices that may utilize the present invention. The present invention can be utilized in any system or device requiring a DC-AC converter.

The system 900 comprises a plurality of power converters 100-1, 100-2, 100-3 . . . 100-N, collectively referred to as power converters 100; a plurality of DC power sources 904-1, 904-2, 904-3 . . . 904-N, collectively referred to as DC power sources 904; a controller 906; a bus 908; and a load center 910. The DC power sources 904 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 100-1, 100-2, 100-3 . . . 100-N is coupled to a single DC power source 904-1, 904-2, 904-3 . . . 904-N, respectively; in some alternative embodiments, multiple DC power sources 904 may be coupled to a single power converter 100, for example a single centralized power converter 100. The power converters 100 are coupled to the controller 906 via the bus 908. The controller 906 is capable of communicating with the power converters 100 by wireless and/or wired communication for providing operative control of the power converters 100. The power converters 100 are further coupled to the load center 910 via the bus 908.

The power converters 100 are resonant power converters that each comprise a three-phase cycloconverter and are each capable of converting the DC power to three-phase AC power. In some embodiments, the power converters 100 are utilized to generate a single-phase AC power as previously described. The power converters 100 couple the generated output power to the load center 910 via the bus 908. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 100 convert the DC input power to AC power that is commercial power grid compliant and couple the AC power to the commercial power grid via the load center 910. In some other embodiments, the power converters 100 are operated to generate and couple current to a split-phase AC line or to a three-phase AC line. Further, the converters 100 may be operated to switch between generating one, two, or three phases of output power, and may additionally be operated to switch among which output lines one or two phases of power are generated. Additionally or alternatively, the converters 100 may employ a burst-mode of operation as previously described.

Figure 10:
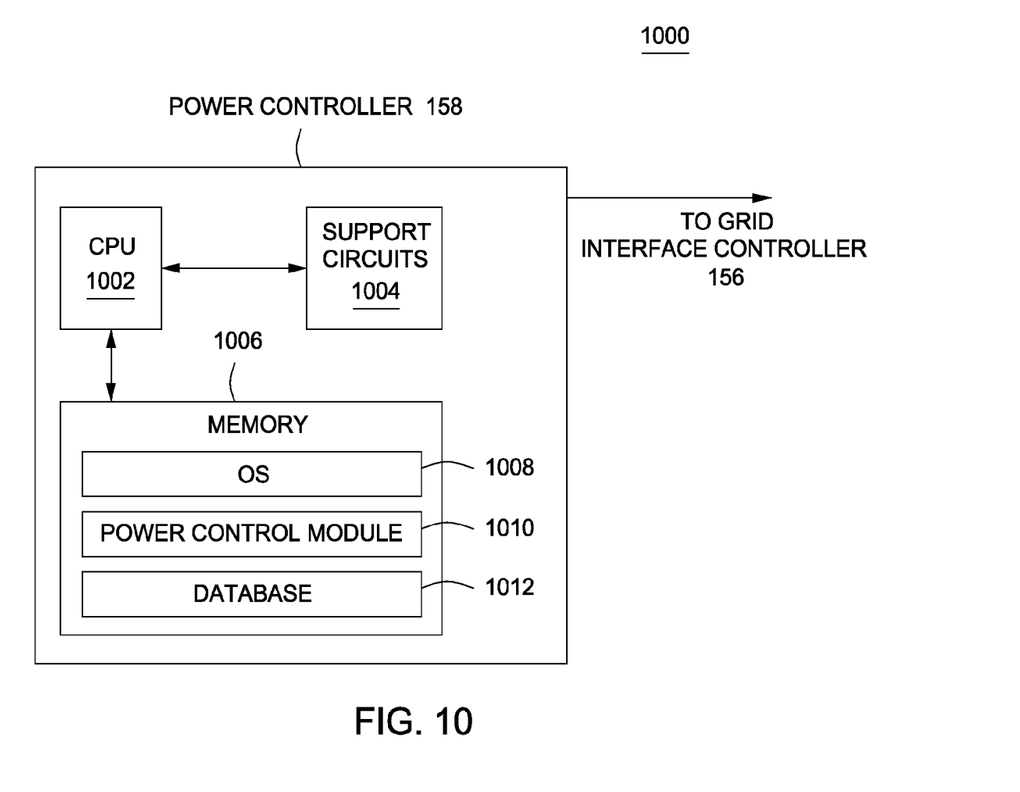
FIG. 10 is a block diagram of a power controller in accordance with one or more embodiments of the present invention.

FIG. 10 is a block diagram of a power controller 158 in accordance with one or more embodiments of the present invention. The power controller 158 comprises support circuits 1004 and a memory 1006, each coupled to a central processing unit (CPU) 1002. The CPU 1002 may comprise one or more conventionally available microprocessors or microcontrollers; alternatively, the CPU 1002 may include one or more application specific integrated circuits (ASICs). The support circuits 1004 are well known circuits used to promote functionality of the CPU 1002. Such circuits include, but are not limited to, a cache, power supplies, clock circuits, buses, input/output (I/O) circuits, and the like. The power controller 158 may be implemented using a general purpose computer that, when executing particular software, becomes a specific purpose computer for performing various embodiments of the present invention.

The memory 1006 may comprise random access memory, read only memory, removable disk memory, flash memory, and various combinations of these types of memory. The memory 1006 is sometimes referred to as main memory and may, in part, be used as cache memory or buffer memory. The memory 1006 generally stores the operating system (OS) 1008, if necessary, of power controller 158 that can be supported by the CPU capabilities. In some embodiments, the OS 1008 may be one of a number of commercially available operating systems such as, but not limited to, LINUX, Real-Time Operating System (RTOS), and the like.

The memory 1006 may store various forms of application software, such as a power control module 1010 for performing functions related to the present invention. For example, the power control module 1010 may determine an output power required from the resonant converter 100 (for example, the required output power may be determined to bias a coupled PV module at a maximum power point (MPP)), receive commands from an external source to operate at a given power and power factor, and the like.

The memory 1006 may additionally store a database 1012 for storing data related to the operation of the resonant converter 100 and/or the present invention, such as required output power levels, required power factor, or the like.

In other embodiments, the CPU 1002 may be a microcontroller comprising internal memory for storing controller firmware that, when executed, provides the power controller functionality.

In some embodiments, two or more of the bridge controller 114, the cycloconverter controller 142, the grid interface controller 156, or the power controller 158 may be a single controller controlled by the same CPU; i.e., a single controller may execute two or more of the bridge control module 210, the cycloconverter control module 310, the grid interface control module 810, or the power control module 1010.

The foregoing description of embodiments of the invention comprises a number of elements, devices, circuits and/or assemblies that perform various functions as described. For example, the three-phase cycloconverter is an example of a means for selectively coupling, based on the DC value, an alternating current to an AC line to generate a single-phase AC output, and the cycloconverter controller is an example of a means for determining a DC value based on a reference waveform and driving the three-phase cycloconverter to selectively couple, based on the DC value, an alternating current to an AC line to generate a single-phase AC output. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is determined by the claims that follow.

The invention claimed is:

1. An apparatus for providing AC power, comprising:
   a three-phase cycloconverter, located on a secondary side of a transformer, coupled to a plurality of AC phase lines and to a neutral line;
   a switch, located on the secondary side of the transformer, coupled across an input of the three-phase cycloconverter, wherein the switch is a fully bi-directional four-quadrant switch; and
   a cycloconverter controller, coupled to the three-phase cycloconverter and to the switch for (i) determining a DC value that indicates a value of a reference waveform during a time window, and (ii) controlling, based on the DC value, the three-phase cycloconverter and the switch to selectively couple an alternating current, the alternating current generated by a resonant circuit, to an AC phase line of the plurality of AC phase lines and to the neutral line to generate only a single-phase AC output.

2. The apparatus of claim 1, wherein the reference waveform is synchronous with an AC voltage on the AC phase line.

3. The apparatus of claim 1, wherein the cycloconverter controller dynamically determines the DC value for each time window of a plurality of consecutive time windows.

4. The apparatus of claim 1, wherein the alternating current is selectively coupled to the AC phase line based on a polarity of the DC value.

5. The apparatus of claim 4, wherein selectively coupling the alternating current to the AC phase line comprises coupling, when the DC value is positive, a positive portion of the alternating current to the AC phase line and a negative portion of the alternating current to the neutral line.

6. The apparatus of claim 4, wherein selectively coupling the alternating current to the AC phase line comprises coupling, when the DC value is negative, a negative portion of the alternating current to the AC phase line and a positive portion of the alternating current to the neutral line.

7. A method for providing AC power, comprising:
   determining a DC value that indicates a value of a reference waveform during a time window; and
   operating, based on the DC value, a three-phase cycloconverter, located on a secondary side of a transformer, and a switch, located on the secondary side of the transformer and coupled across an input of the three-phase cycloconverter, to generate only a single-phase AC output by selectively coupling an alternating current, the alternating current generated by a resonant circuit, to (i) an AC phase line of a plurality of AC phase lines coupled to the three-phase cycloconverter and (ii) to a neutral line coupled to the three-phase cycloconverter, wherein the switch is a bi-directional four-quadrant switch.

8. The method of claim 7, further comprising generating the reference waveform synchronous with an AC voltage on the AC phase line.

9. The method of claim 7, further comprising dynamically determining the DC value for each time window of a plurality of consecutive time windows.

10. The method of claim 7, wherein the alternating current is selectively coupled to the AC phase line based on a polarity of the DC value.

11. The method of claim 10, further comprising coupling, when the DC value is positive, a positive portion of the alternating current to the AC phase line and a negative portion of the alternating current to the neutral line.

12. The method of claim 10, further comprising coupling, when the DC value is negative, a negative portion of the alternating current to the AC phase line and a positive portion of the alternating current to the neutral line.

13. A system for providing AC power, comprising:
a photovoltaic (PV) module; and
a resonant converter, coupled to the PV module and to a plurality of AC phase lines and to a neutral line, comprising:
a three-phase cycloconverter, located on a secondary side of a transformer, coupled to the plurality of AC phase lines and to the neutral line;
a switch, located on the secondary side of the transformer, coupled across an input of the three-phase cycloconverter, wherein the switch is a bi-directional four-quadrant switch; and
a cycloconverter controller, coupled to the three-phase cycloconverter and to the switch, for (i) determining a DC value that indicates a value of a reference waveform during a time window, and (ii) controlling, based on the DC value, the three-phase cycloconverter and the switch to selectively couple an alternating current, the alternating current generated by a resonant circuit, to an AC phase line of the plurality of AC phase lines and to the neutral line to generate only a single-phase AC output.

14. The system of claim 13, further comprising dynamically determining the DC value for each time window of a plurality of consecutive time windows.

15. The system of claim 13, wherein the alternating current is selectively coupled to the AC phase line based on a polarity of the DC value.

16. The system of claim 13, further comprising coupling, when the DC value is positive, a positive portion of the alternating current to the AC phase line and a negative portion of the alternating current to the neutral line.

17. The system of claim 13, further comprising coupling, when the DC value is negative, a negative portion of the alternating current to the AC phase line and a positive portion of the alternating current to the neutral line.

* * * * *